(12) United States Patent  
Lee (10) Patent No.: US 8,619,414 B2  
(45) Date of Patent: Dec. 31, 2013

(54) DISPLAY DEVICE

(75) Inventor: Jae Hun Lee, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 165 days.

(21) Appl. No.: 13/383,153

(22) PCT Filed: Jul. 21, 2010

(86) PCT No.: PCT/KR2010/004785
§ 371 (c)(1),
(2), (4) Date: Jan. 9, 2012

(87) PCT Pub. No.: WO2011/010873
PCT Pub. Date: Jan. 27, 2011

(65) Prior Publication Data
US 2012/0275097 A1    Nov. 1, 2012

(30) Foreign Application Priority Data

Jul. 23, 2009 (KR) .................. 10-2009-0067311

(51) Int. Cl.
*G06F 1/16* (2006.01)
(52) U.S. Cl.
USPC ...... 361/679.21; 348/725; 345/214; 349/139; 455/404.2
(58) Field of Classification Search
USPC ......... 348/836, 731, 725, 14–1; 345/1.3, 175, 345/60, 690, 149.4, 173, 211, 214, 87, 549, 345/107, 156, 30, 55; 349/5, 124, 98, 106, 349/113, 114, 62, 38, 139, 58; 361/810, 361/679.07, 679.26, 679.22, 679.56, 361/679.32, 679.09, 679.01, 679.31, 679.6, 361/679.17, 679.48, 679.33, 679.23, 361/679.03, 679.15, 679.21, 679.27; 455/558, 334, 550.1, 517, 456.1, 455/404.2, 456.3, 418, 556.1; 381/388
See application file for complete search history.

(56) References Cited

U.S. PATENT DOCUMENTS

| | | | |
|---|---|---|---|
| 6,498,431 B1 | 12/2002 | Katayama et al. | |
| 2004/0156192 A1 | 8/2004 | Kerr et al. | |
| 2005/0073517 A1 | 4/2005 | Wu et al. | |
| 2009/0168319 A1* | 7/2009 | Jeon et al. | 361/679.22 |
| 2009/0169045 A1* | 7/2009 | Liu et al. | 381/388 |
| 2010/0085643 A1 | 4/2010 | Lee et al. | |
| 2010/0128425 A1* | 5/2010 | Chen et al. | 361/679.07 |
| 2010/0231815 A1* | 9/2010 | Kim et al. | 348/836 |

FOREIGN PATENT DOCUMENTS

| | | |
|---|---|---|
| DE | 101 37 919 A1 | 6/2002 |
| EP | 2053305 A1 | 4/2009 |
| KR | 10-2001-0032757 A | 4/2001 |
| KR | 20-0225343 Y1 | 6/2001 |
| KR | 10-2008-0025454 A | 3/2008 |
| KR | 10-2009-0072945 A | 7/2009 |

* cited by examiner

*Primary Examiner* — Hung Duong
(74) *Attorney, Agent, or Firm* — Birch, Stewart, Kolasch & Birch, LLP (57) ABSTRACT

The present invention relates to a display device, and more particularly, to a display device in which a front cover and so on exposed to an outside of the display device have a gradation effect.

5 Claims, 10 Drawing Sheets

DISPLAY DEVICE

TECHNICAL FIELD

The present invention relates to a display device in which a front cover and so on exposed to an outside of the display device have a gradation effect.

BACKGROUND ART

The present invention relates to a display device in which a front cover and so on exposed to an outside of the display device have a gradation effect.

The display device is a device for receiving an image information from an outside of the display device and displaying the image information thereon, a typical example of which is television set or a monitor, and a concept including all devices that receive an image signal from an outside of the device and display the image signal thereon.

Currently, conventional CRT (A display device of a high vacuum electron tube for producing a visible image by using cathode rays, i.e., electrons emitted from a cathode in a vacuum) type display device is rapidly being replaced with a display device which uses LCD (Liquid Crystal Display, a display which uses an electric device that converts electric information into visual information by using variation of transmissivity of liquid crystals caused by variation of an applied voltage) or PDP (Plasma Display Panel, a flat display device which uses gaseous discharge (plasma)). The LCD type or the PDP type display device has a thickness reduced drastically compared to the conventional CRT type display device.

The LCD type or the PDP type flat display device is used installed as a stand type or a wall mounting type.

The flat display device has a display module exposed to a front for displaying an image, a front cover for supporting a periphery of the panel, and a rear cover fastened to the front cover to form an exterior thereof.

The display module can be secured between the front cover and the rear cover, fastened either to the front cover or the rear cover.

If the display device is installed, the display device can be supported by a stand having a neck portion and a base. The neck portion is coupled to a lower portion or a rear side of a body of the display device for supporting weight of the body.

The neck portion is fastened to the base for distributing the weight of the body to an installed surface for maintaining the display device installed in an upright state.

Once the display device is installed thus, besides displaying an image, the display device is required to be in harmony with surrounding interiors.

Particularly, if image qualities of the display modules are similar, besides a price of the display device, an important factor that serves to determine a buying pattern of the user is sensational satisfaction, such as design and the like.

In general, of the cover which holds the display module, a portion exposed to a user's sight is an injection molding of plastic.

In general, a front cover and a neck portion or a base of a stand of the display device, such as a large sized TV set, formed of dark colored non-transparent resin, are difficult to make individuality of the product distinctive. In order to change such a monotonous appearance, though, the front cover, or the neck portion or the base of the stand, is two times injection molded with two kinds of materials, or coated, since a fabrication process becomes complicate and a defect ratio of the product increases, to require a new production equipment, a cost of the product increases at the end.

DISCLOSURE OF INVENTION

Technical Problem

To solve the problems, an object of the present invention is to provide a display device in which a front cover and the like exposed to an outside have a gradation effect.

Additional advantages, objects, and features of the disclosure will be set forth in part in the description which follows and in part will become apparent to those having ordinary skill in the art upon examination of the following or may be learned from practice of the invention.

Solution to Problem

To achieve these objects and other advantages and in accordance with the purpose of the invention, as embodied and broadly described herein, a display device includes a front cover having a display region and a non-display region formed of a light transmissive material to have a thickness varied with a distance to the display region, a display module arranged in rear of the front cover, and a rear cover which surrounds a back side of the display module.

In this instance, the non-display region of the front cover is divided into an inner edge adjacent to the display region, an outer edge, and a middle portion which connects the inner edge to the outer edge, wherein the at least one of the inner edge and the outer edge may have a thickness thicker than the middle portion.

The front cover may be formed of a light transmissive resin or glass.

The front cover may be an injection molding of polycarbonate resin.

The light transmissive resin may have a particular color.

The non-display region of the front cover may include one pair of horizontal frames for supporting horizontal edges of the display module, and one pair of vertical frames respectively connected to adjacent two horizontal frames for supporting vertical edges of the display module, wherein a thickness of the inner edge and the outer edge of any one frame is thicker than a thickness of the middle portion.

At least one frame of the front cover may have a convex surface protruded outward from the inner edge and the outer edge or the middle portion.

A boundary between the middle portion and the inner edge or the outer edge of the front cover having a thickness thicker than the middle portion is rounded.

At least one of the inner edge and the outer edge of the front cover may be bent toward the display module.

In another aspect of the present invention, a display device includes a display body including a front cover having a display region and a non-display region, a display module arranged in rear of the front cover, and a rear cover which surrounds a back side of the display module, and a stand including a neck portion mounted to the display body and a base portion connected to the neck portion for seating on a mounting surface.

The base portion includes a base cover formed of a light transmissive material to have a pass through hole therein for pass through of the neck portion.

The base cover has an edge portion with a thickness thicker than other portion of the base cover:

The neck portion may include a neck cover formed of a light transmissive material to have a height, wherein the neck cover may have a thickness of a top side and a thickness of a bottom side varied in a vertical direction.

The non-display region of the front cover is divided into an inner edge adjacent to the display region, an outer edge, and a middle portion which connects the inner edge to the outer edge, wherein the at least one of the inner edge and the outer edge may have a thickness thicker than the middle portion.

An inside surface of the neck cover and a bottom surface of the base cover may be painted or coated with a non-transparent material.

Both the neck cover and the base cover may be injection moldings of polycarbonate resin of a particular color.

In another aspect of the present invention, a display device includes a front cover including a display region and a non-display region formed of a light transmissive material, a display module arranged in rear of the front cover, and a rear cover which surrounds a back side of the display module.

In this instance, the non-display region of the front cover is divided into an inner edge adjacent to the display region, an outer edge, and a middle portion which connects the inner edge to the outer edge, both the inner edge and the outer edge are bent toward the display module, and a boundary of any one edge and the middle portion is rounded.

Any one edge rounded thus may have a thickness thicker than the middle portion.

The non-display region of the front cover includes one pair of horizontal frames for supporting horizontal edges of the display module, and one pair of vertical frames respectively connected to adjacent two horizontal frames for supporting vertical edges of the display module, wherein a thickness of the inner edge and the outer edge of any one frame is thicker than a thickness of the middle portion.

The display device may further include a stand including a neck portion mounted to the body and a base portion connected to the neck portion for seating on a mounting surface.

The base portion includes a base cover formed of a light transmissive material to have a pass through hole therein for pass through of the neck portion, and an edge portion with a thickness thicker than other portion of the base cover.

The neck portion includes a neck cover formed of a light transmissive material to have a height, wherein the neck cover has a thickness of a top side and a thickness of a bottom side varied in a vertical direction.

The edge of the base cover may be rounded.

Advantageous Effects of Invention

The present invention has following advantageous effects.

The display device of the present invention can produce a beautiful exterior by giving a gradation effect to members of the display device exposed to an outside of the display device.

Effects obtainable from the embodiments of the present invention are not limited to the effects mentioned above, and other effects not mentioned herein can be derived from the description of the embodiments of the present invention and clearly understood by persons skilled in this field of art. That is, unintended effects found as the present invention is put into practice can also be derived from the embodiments of the present invention by persons skilled in this field of art.

BRIEF DESCRIPTION OF DRAWINGS

The above and other aspects, features, and advantages of the present invention will become more apparent upon consideration of the following description of preferred embodiments, taken in conjunction with the accompanying drawings.

In the drawings.

BEST MODE FOR CARRYING OUT THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

The display device in accordance with a preferred embodiment of the present invention includes a front cover having a display region for exposing an image to an outside of the display device and a non-display region of a light transmissive material having a thickness varied with distances, a display module arranged in rear of the front cover, and a rear cover which surrounds a back side of the display module.

Figure 1:
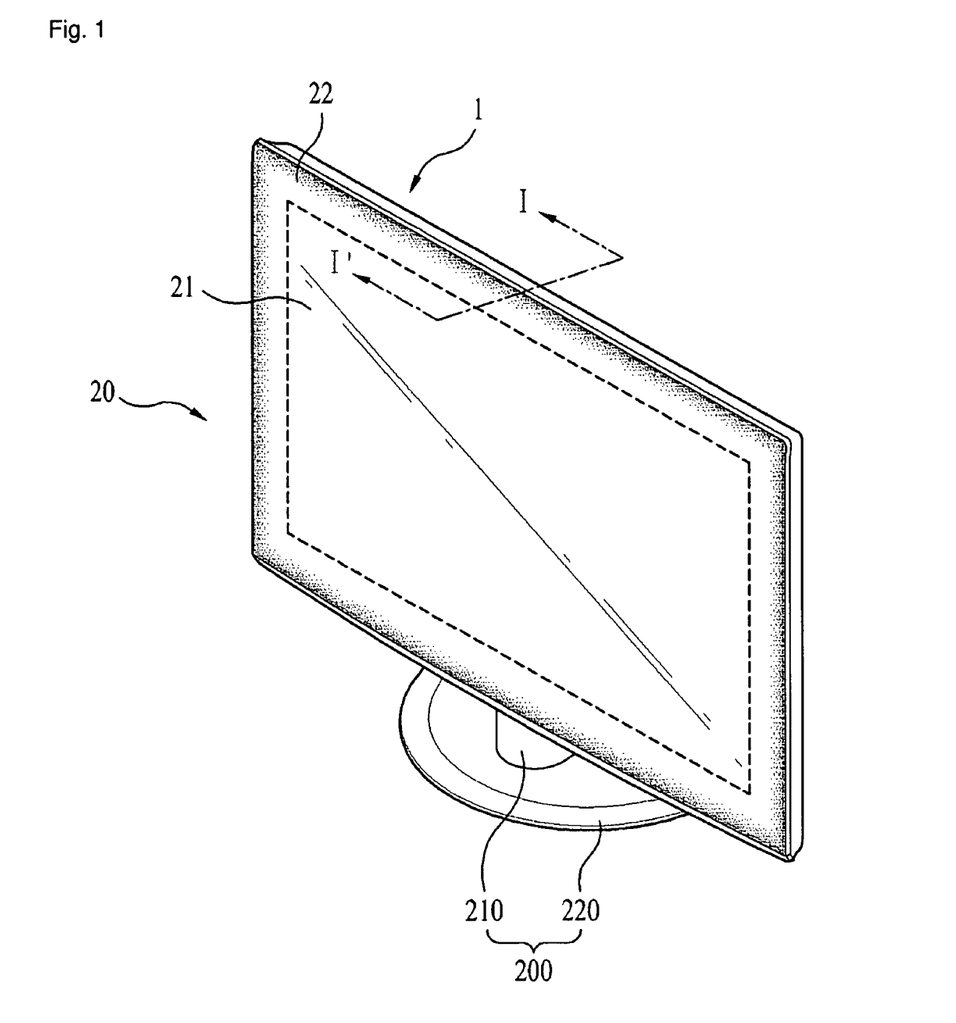
FIG. 1 illustrates a perspective view of a display device in accordance with a preferred embodiment of the present invention.
Figure 2:
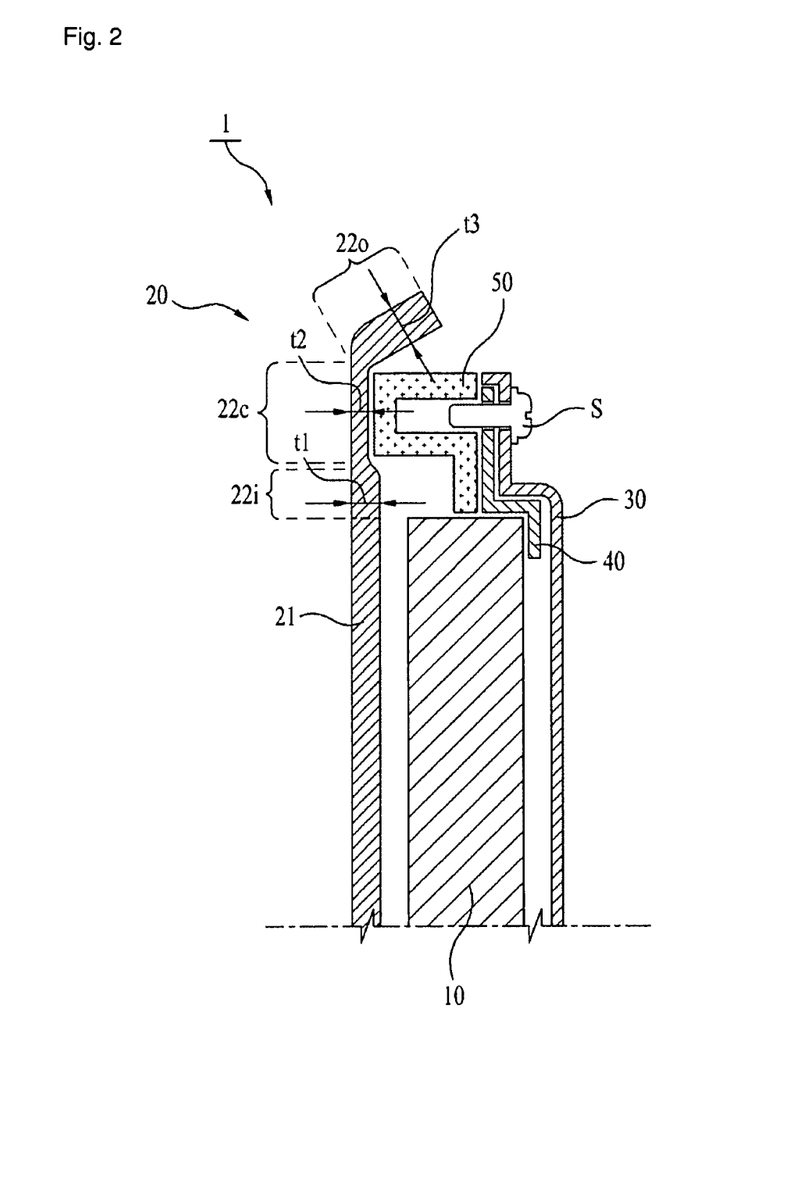
FIG. 2 illustrates a section across a line I-I' in FIG. 1 showing key parts of the display device.

FIG. 1 illustrates a perspective view of a display device in accordance with a preferred embodiment of the present invention, and FIG. 2 illustrates a section across a line I-I' in FIG. 1 showing key parts of the display device.

Referring to FIGS. 1 and 2, the display device 1 includes a front cover 20, a display module 10, and a rear cover 30.

The front cover 20 includes a display region 21 for displaying an image from the display module 10 to an outside of the display device 1, and a non-display region 22, and is constructed of a plate of light transmissive resin or glass to cover an entire front surface of the display module 10.

The non-display region 22 may be formed by printing or coating semi-transparent or non-transparent ink or film on an edge of the plate, and the front cover 20 may be formed such that a boundary (dashed line) between the display region 21 and the non-display region 22 is not distinctive.

That is, colors of peripheries of the display region 21 and the non-display region 22 may be determined intentionally such that the display region 21 and the non-display region 22 are not distinctive if no image is displayed.

Moreover, the front cover 20 may have a plurality of functional layers stacked thereon for adjusting an optical characteristic of the image on the display module 10, and shielding an electron-magnetic wave or a near infrared ray, or the like.

For an example, depending on characteristics of the display module 10, the front cover 20 may have an EMI shielding film, an NIR blocking film, a Color Adjusting film for adjusting a color, such as an orange color and improving a color purity, an impact absorption film, and an AR/anti-reflection film for preventing the image from becoming poor due to reflection of an external light at a screen surface, added thereto.

The front cover 20 may be a compression injection molding of polycarbonate resin.

The display device has varied thickness or rounded corner portions of members exposed to an outside of the display device, such as the front cover 20, for providing a gradation effect. That is, depending on the thickness and rounding treatment, an effect can be expected, in which the gradation varies gradually though the member is formed of the same material.

The non-display region 22 of the front cover 20 may be divided into an inner edge 22i adjacent to the display region 21, an outer edge 22o opposite to the inner edge 22i, and a middle portion 22c connecting the inner edge 22i to the outer edge 22o, wherein at least one of the inner edge 22i and the outer edge 22o can be formed thicker than the middle portion 22c.

In this instance, the inner edge 22i, the outer edge 22o, and the middle portion 22c are regions of the front cover 20 formed as one unit divided in imaginary.

The non-display region 22 of the front cover 20 may have convex surfaces protruded outward from the inner edge 22i, the outer edge 22o or the middle portion 22c.

Moreover, at least one of the inner edge 22i and the outer edge 22o of the front cover 20 may be bent toward the display module 10, and, of the inner edge 22i and the outer edge 22o of the front cover 20, a boundary between the inner edge 22i or the outer edge 22o having a thickness greater than the middle portion 22c and the middle portion 22c may be rounded.

Though FIG. 2 illustrates a case when the thickness t1 or t2 of the inner edge 22i or the outer edge 22o is greater than the thickness t2 of the middle portion 22c, and a case when the boundary between the outer edge 22o and the middle portion 22c is rounded, the cases are not limited to above portions.

In the meantime, the display device 1 includes at least one mounting members 40 and 50 for coupling the front cover 20 to the rear cover 30 in a state the display module 10 is supported.

Moreover, the display device 100 may include a stand 200 for making upright supporting of the body 100, additionally. Optionally, the stand 200 may be detachably mounted.

The display device 1 is connected to the display module 10 electrically, and may include a driving unit (a printed circuit board, not shown) for controlling an image on, sound from, or communication of the display module 10, and a speaker module (not shown) for generating sound, additionally.

The gradation effect of the display device 1 will be described together with the following embodiment.

Figure 3:
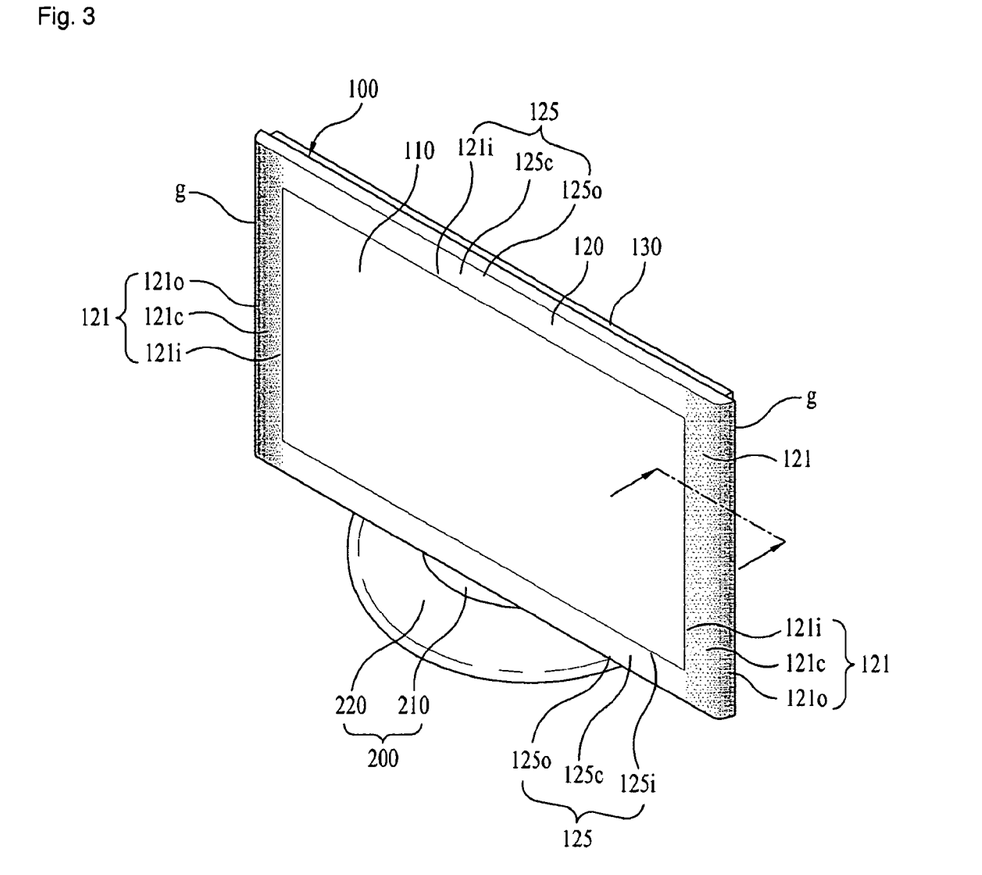
FIG. 3 illustrates a perspective view of a display device in accordance with another preferred embodiment of the present invention.

FIG. 3 illustrates a perspective view of a display device in accordance with another preferred embodiment of the present invention. A flat display device includes a body 100 for displaying an image. The display device in FIG. 3 is different from the display device 1 described with reference to FIGS. 1 and 2 in the front cover and so on, and description of parts identical to the parts in the display device 1 will be omitted.

The body 100 displays the image, and the display module 110 exposed to a front of the display device is housed in a space formed by the front cover 120 and the rear cover 130, and the image is displayed on a panel surface exposed to the front of the display device.

The display device 100 may include a stand 200 for making upright supporting of the body 100, additionally. Optionally, the stand 200 may be mounted to the body 100, detachably.

The display device is connected to the display module 110 electrically, and may include a driving unit (a printed circuit board, not shown) for controlling an image on, sound from, or communication of the display module 110, and a speaker module (not shown) for generating sound, additionally.

The stand 200 may include a neck portion 210 having a height and mounted to the body 200 which displays the image, and a base portion 220 connected to the neck portion for seating on a mounting surface.

In detail, the neck portion 210 can serve to support the load of the display body and distribute the load of the body applied to the neck portion.

In the meantime, of course, the display device may be used as a wall mounting type by using a wall mount while omitting the stand.

Of course, the front cover 120 may have a polygonal frame structure which supports edges of the display module 110, or, as described with reference to FIGS. 1 and 2, may have a structure which covers the front of the display module 110 with a flat structure of transparent glass or resin.

The front cover 120 may be a compression injection molding of polycarbonate resin.

That is, the front cover 120 may have the polygonal frame having an opened center portion for supporting edges of the display module 110, when the display region which displays the image from the display module 110 to an outside may be the opening at the center portion of the front cover 120, and the non-display region may have the polygonal frame.

The display device has varied thickness or rounded corner portions of members exposed to an outside of the display device, such as the front cover 120, for providing a gradation effect. That is, depending on the thickness and rounding, an effect can be expected, in which the gradation varies gradually though the member is formed of the same material.

The thickness variation and the rounding can make a boundary between the display module 110 and the non-display region of the front cover 120 not distinctive.

That is, the gradation effect can be utilized, which is made available by adjustment of thickness of the front cover or rounding such that brightness of the boundary is the same taking a color of the display module 110 itself and a color of the resin of the edge of the front cover into account.

For convenience's sake, as an example, a front cover 120 having a center opening for supporting edges of the display module 110 will be described.

Even in a case various kinds of functional filters of transparent glass (a glass filter) or a transparent resin are mounted to the front of the front cover, the front cover described later can be applied. In this case, it is required to understand that the front cover includes the various kinds of functional filters.

The display device in accordance with a preferred embodiment of the present invention may include a body 100 having a display module 110 exposed to a front of the display device for displaying an image, a front cover 120 arranged on a front of front edges of the display module 110, and a rear cover 130 which covers a back side of the display module 110, wherein the front cover 120 may be formed of transparent resin of a particular color.

The non-display region of the front cover 120 can be divided into an inner edge adjacent to the display region, an outer edge, and a middle portion connecting the inner edge to the outer edge, wherein at least one of the inner edge and the outer edge can be formed thicker than the middle portion.

As described before, in many cases, a portion of the front cover 120 which surrounds the front edges of the display module 110 is an injection molding of a black or thick color, making a product design monotonous and difficult to display a variety of outer appearance effects.

Therefore, in order to avoid such monotonous outer appearance, the display device of the present invention provides a gradation effect at a portion exposed to a field of view of a watcher.

The gradation effect is an effect in which variation of concentration or brightness is gradual. That is, a color or brightness of the front cover or the like of the display device varies with positions, gradually.

The gradation effect makes design of a product to be much high quality, and can provide a sense of stereo or splendor.

In order to provide the sense of stereo or splendor to the front cover and the like, though the front cover is two times injection molded with at least two materials, or coated on a surface thereof for providing the graduation effect, the former case has a problem of an increased production cost, and the latter has a problem of peel off, failing maintenance of the coating for a long time.

Accordingly, in the display device of the present invention, the front cover and the like is formed of transparent resin of a particular color, and for providing the gradation effect, the front cover has a varied cross sectional thickness.

Referring to FIG. 3, the front cover 120 has one pair of vertical frames 121 and one pair of horizontal frames 125 mounted to be exposed to a front direction of the display module 110.

In detail, the non-display region of the front cover 120 includes one pair of horizontal frames 125 for supporting horizontal edges of the display module 110, and one pair of vertical frames 121 for supporting vertical edges of the display module 110, and may have a polygonal frame structure, wherein a thickness of at least one edge of an inner edge and an outer edge of any one frame may be thicker than a thickness of a middle portion.

Each of the one pair of vertical frames 121 and the one pair of horizontal frames 125 may be divided into an inner edge 121i or 125i in a center direction of the display module 110, an outer edge 121o, or 125o opposite to the inner edge, and a middle portion 121c or 125c connecting the inner edge 121i or 125i to the outer edge 121o or 125o, respectively.

The inner edge 121i or 125i, the outer edge 121o or 125o, and the middle portion 121c or 125c are regions of the front cover 120 formed as one unit divided in imaginary.

The front cover 120 may be formed of transparent resin of a particular color, and at least one of the inner edge 121i or 125i and the outer edge 121o or 125o of the one pair of vertical frames 121 and the one pair of horizontal frames 125 of the front cover may have a thickness thicker than the middle portion 121c or 125c which connects the inner edge 121i or 125i to the outer edge 121o or 125o.

Moreover, at least one of the frames 121 or 125 of the front cover 120 may have convex surfaces protruded outward from the inner edge 121i or 125i and the outer edge 121o or 125o or the middle portion 121c or 125c.

Moreover, at least one of the inner edge 121i or 125i and the outer edge 121o or 125o of the front cover 120 may be bent toward the display module 110, and, of the inner edge 121i or 125i or the outer edge 121o or 125o of the front cover 120, a boundary between the inner edge 121i or 125i and the outer edge 121o or 125o having a thickness greater than the middle portion 121c or 125c and the middle portion 121c or 125c may be rounded.

Referring to FIG. 3, the front cover 120 has the gradation effect at the outer edges 1210 of the vertical frames, respectively. Therefore, in order to make the outer edges 1210 of the vertical frames of the front cover 120 to have the gradation effect, the outer edge 121o of the front cover may be thicker than the middle portion 121c which connects the outer edge to the inner edge, or rounded. The edge thickness and/or rounding will be described with reference to FIG. 2.

FIGS. 4A~4F illustrate sections of various vertical frames of the front cover in FIG. 3, respectively.

In detail, FIGS. 4A, 4B, and 4C respectively illustrate cases when at least one of the outer edge 121o and the inner edge 121i of the vertical frame 121 of the front cover 120 has a thickness thicker than a thickness of the middle portion 121c which connects the outer edge 121o to the inner edge 121i, and FIGS. 4D, 4E, and 4F respectively illustrate cases when at least one of the outer edge 121o and the inner edge 121i of the vertical frame 121 of the front cover 120 has a thickness thicker than a thickness of the middle portion 121c which connects the outer edge 121o to the inner edge 121i, as well as rounded.

The front covers in FIGS. 4A to 4F are formed of light transmissive resin of a particular color. That is, since the front cover is formed of transparent resin, the front cover has a certain extent of light transmissivity, and since the front cover has, not only transparent, but also the particular color, if the thickness is great, the front cover appears dark, and if the thickness is small, the front cover appears bright.

The front cover of the display device of the present invention can be formed of a transparent resin of a particular color, for an example, polycarbonate PC. If a small amount of pigment of a particular color is added to the transparent polycarbonate, the front cover can be injection molded to be transparent with the particular color.

If injection molded with a resin of the particular color, brightness varies with the thickness of the injection molded product. That is, a thick portion appears darker than a thin portion, because transmissivity of a light incident on an opposite side is inversely proportional to the thickness.

Referring to FIGS. 4A, 4B and 4C, the thickness of the inner edge 121i and/or the outer edge 121o of the vertical frame 121 of the front cover is thicker than the thickness of the middle portion 121c which connects the inner edge 121i to the outer edge 121o.

Accordingly, if the user looks at the front cover 120 from a front side of the display device, the inner edge 121i and/or the outer edge 121o can appears dark according to the thickness.

Of the embodiments respectively shown in FIGS. 4A, 4B and 4C, in the embodiment shown in FIG. 4A, the outer edge 121o(1) will appear the darkest as the thickness of the outer edge 121o(1) is thicker than the inner edge 121i(1) and the middle portion 121c(1).

Of the embodiments respectively shown in FIGS. 4A, 4B and 4C, in the embodiment shown in FIG. 4B, the inner edge 121i(2) and the outer edge 121o(2) will appear darker as the thicknesses of the inner edge 121i(2) and the outer edge 121o(2) are thicker than the middle portion 121c(2).

Of the embodiments respectively shown in FIGS. 4A, 4B and 4C, in the embodiment shown in FIG. 4C, the inner edge 121i(3) will appear darker as the thickness of the inner edge 121i(3) is thicker than the outer edge 121o(3) and the middle portion 121c(3).

Referring to FIGS. 4A, 4B and 4C, if the user looks at a thicker portion of the inner edge 121*i* and/or the outer edge 121*o*, a light transmission path is shown in arrows. A line of sight of the user who looks the display device from a front thereof transmits in a direction of the arrow starting from a point of observation, and the portion of the front cover can appear dark or bright according to a length of the arrow (a transmission length of the line of sight) even if the portion is formed of the same material.

The embodiments respectively shown in FIGS. 4D, 4E and 4F are different from the embodiments respectively shown in FIGS. 4A, 4B and 4C in that a thicker portion of the inner edge 121*i* and/or the outer edge 121*o* of the vertical frame 121 of the front cover is rounded intentionally in addition to the variation of the thickness of the front cover. If the thicker portion of the inner edge 121*i* and/or the outer edge 121*o* of the vertical frame 121 of the front cover is rounded intentionally, the length of the arrow (the transmission length of the line of sight) increases more, thereby making the gradation effect greater.

That is, if an outer corner and the inner corner which are bent portions of the front cover 120 are rounded, the transmission length of the line of sight of the observer can become longer than a case the portions are not rounded depending on an angle of sight of the observer, thereby increasing the gradation effect as the transmission length of the line of sight becomes longer. Accordingly, even if the thickness is varied with the same thickness and the same material, the gradation effect at the boundary region can be amplified depending on the rounding.

Since the embodiments respectively shown in FIGS. 4A, 4B and 4C have no difference from the embodiments respectively shown in FIGS. 4D, 4E and 4F except that the thicker potion of the front cover 120 is rounded, repetitive description of the embodiments respectively shown in FIGS. 4D, 4E and 4F will be omitted.

If FIG. 4A is compared to FIG. 4D, it can be known that, though the outer edge 120*o* of the front cover 120 is thicker than the inner edge 121*i* and the middle portion 121*c* in both of the embodiments shown in FIGS. 4A and 4D, the front cover shown in FIG. 4D having the thicker outer edge 121*o* rounded thus has a longer transmission line of sight.

Eventually, by above methods, the gradation effect that the present invention intends to achieve can be made greater. That is, a difference of brightness between the thicker portion and the other portion can be made distinctive.

Alike the embodiments respectively shown in FIGS. 4A, 4B and 4C, since the thickness of one or both of the outer edge 120*o* and the inner edge 121*i* is thicker than the middle portion 121*c* which connects the outer edge 120*o* to the inner edge 121*i*, the embodiments respectively shown in FIGS. 4D, 4E and 4F can also have the gradation effect, and can make the gradation effect greater by rounding the thicker portions of the front cover.

In addition to this, a back side of a periphery region of the front cover 120 can be painted or coated with a non-transparent material (for an example, paint).

If the front cover covers an entire front of the display module, the non-display region is the back side, and if the front cover has an opening in a portion matching to the display module, the back side of the non-display region of the front cover can be painted with a non-transparent material.

This is for making objects positioned at the backside of the front cover invisible by shielding a light. Thus, even if the back side of the front cover 120 is painted or coated with a non-transparent material (for an example, paint), the gradation effect owing to variation of the thickness of the outer boundary is not affected.

Figure 4:
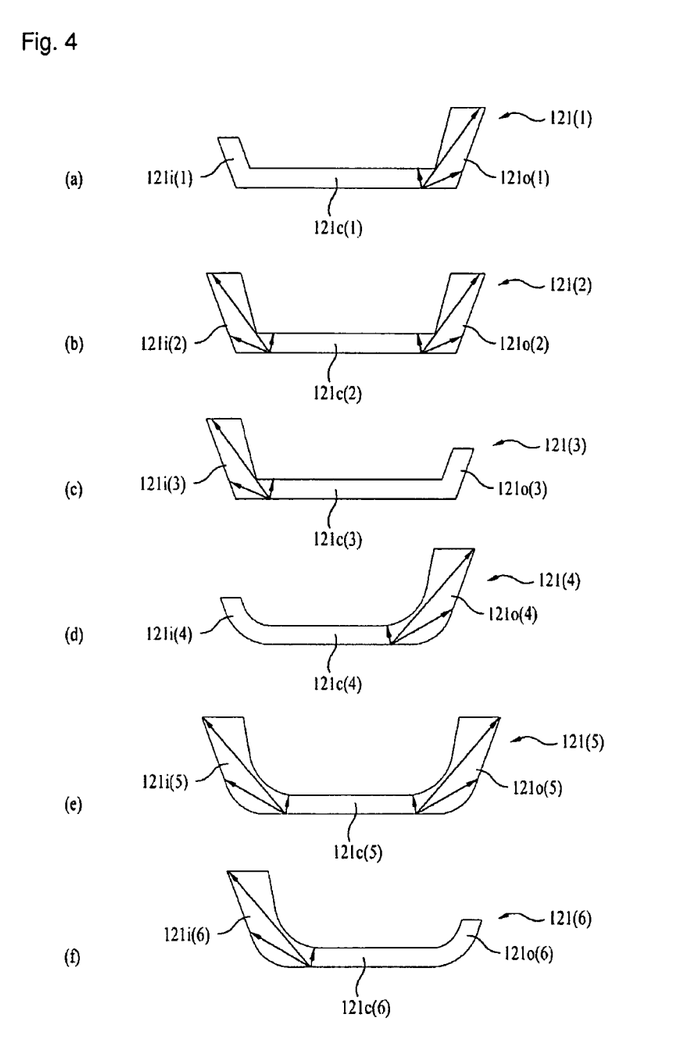
FIGS. 4A~4F illustrate sections of vertical frames of the front cover in FIG. 3, respectively.
Figure 5:
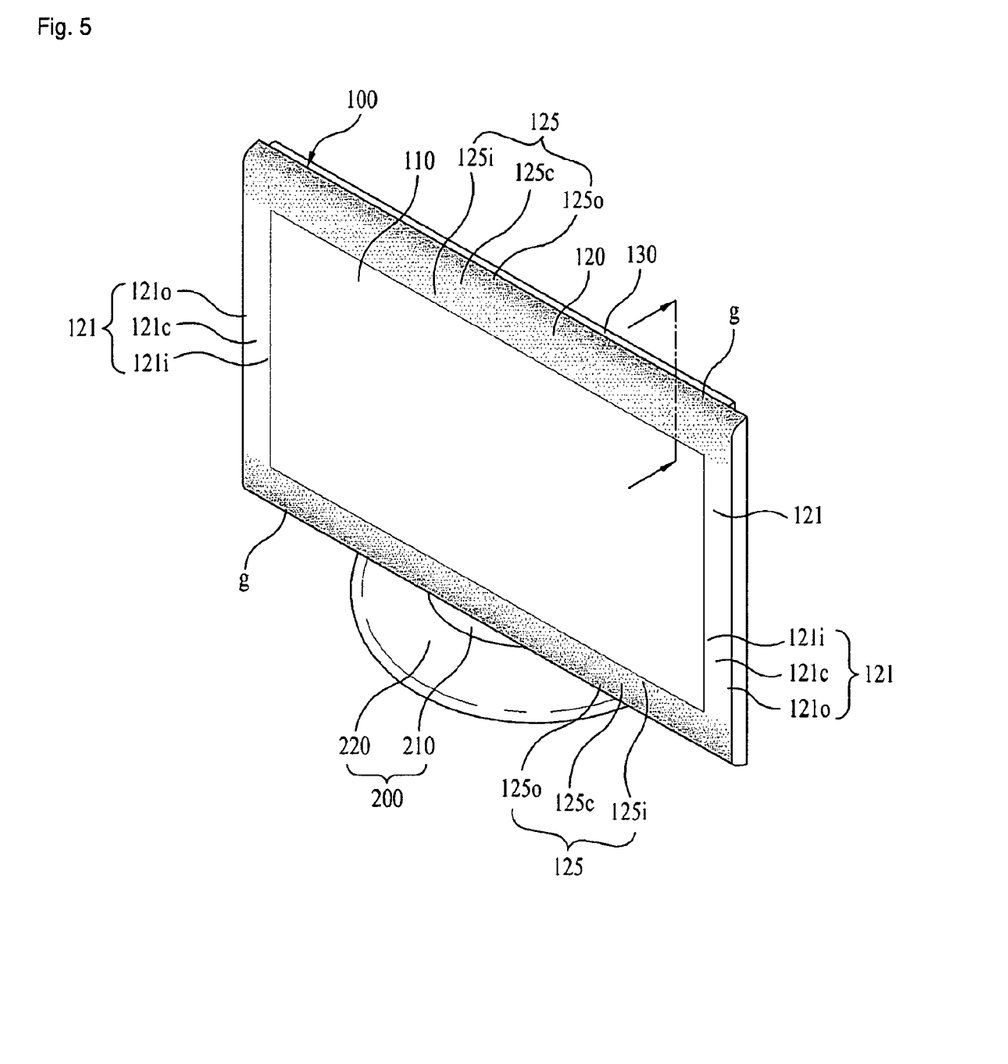
FIG. 5 illustrates a perspective view of a display device in accordance with another preferred embodiment of the present invention.

FIG. 5 illustrates a perspective view of a display device in accordance with another preferred embodiment of the present invention. Description which duplicates with the description made with reference to FIGS. 3 and 4 will be omitted, and description of the embodiment will be made focused on difference of the embodiment from the FIGS. 3 and 4.

Different from the embodiment shown in FIG. 3, in the embodiment shown in FIG. 5, the gradation effect is generated at one pair of the horizontal frames 125 of the front cover 120.

Referring to FIG. 5, a portion intended to have the gradation effect is an outer edge 125*o* of the horizontal frame 125.

FIGS. 6A~6F illustrate sections of the front cover of the display device in FIG. 5, respectively. In detail, since the sections of the horizontal frames 125 of the front cover in FIG. 5 are sections of the horizontal frame positioned on an upper side of the horizontal frame 125, the sections are matching to FIG. 6A.

Alike the vertical frames described with reference to FIGS. 4A~4F, as can be noted in the sections shown in FIGS. 6A~6F, by varying the thickness of the inner edge 121*i* and/or the outer edge 120*o* of the front cover, or intentionally rounding the thicker portion of the inner edge 121*i* and/or the outer edge 120*o* of the horizontal frame 125, the gradation effect can be generated.

Alike the description made with reference to FIGS. 4A~4F, if the thicker portion of the inner edge 121*i* and/or the outer edge 120*o* of the horizontal frame 125 of the front cover is rounded, increasing a length of the arrow (a transmission length of the line of sight), the gradation effect can be made greater. Description which duplicates with the description made with reference to FIGS. 4A~4F is omitted.

Figure 7:
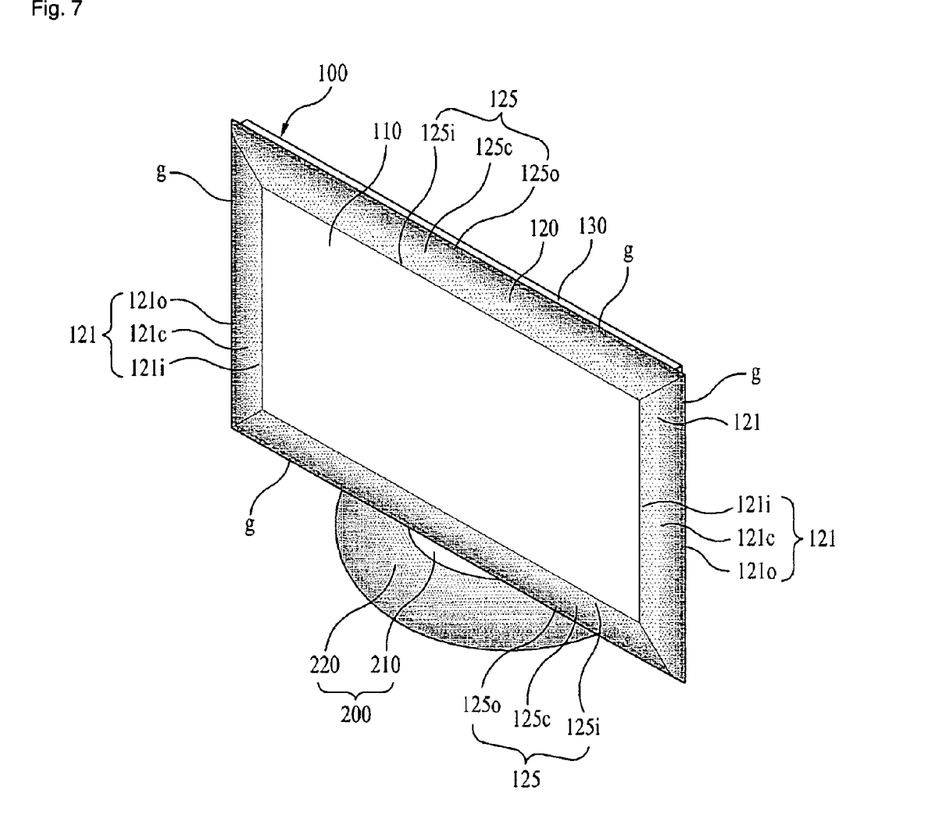
FIG. 7 illustrates a perspective view of a display device in accordance with another preferred embodiment of the present invention.

FIG. 7 illustrates a perspective view of a display device in accordance with another preferred embodiment of the present invention. In the embodiment shown in FIG. 5, by varying a thickness of, or rounding, the outer edge of the one pair of the vertical frames 121 and the one pair of horizontal frames 125 of the front cover 120 which covers a periphery of the display module 110, the gradation effect is obtained.

Different from the embodiments respectively shown in FIGS. 3 and 5, the embodiment shown in FIG. 7 has the gradation effect, not at one of the vertical frames or the horizontal frames, but all of the vertical frames and the horizontal frames.

Therefore, the vertical frames and the horizontal frames of the front cover of the display device shown in FIG. 7 may have cross sections identical to FIGS. 4A~4F and FIGS. 6A~6F, respectively. Description which duplicates with the description made with reference to FIGS. 3 to 6F is omitted. As described before, in the embodiment shown in FIG. 7, the stand 200 which supports the body of the display device includes a neck portion for supporting a load of the body and a base portion for distributing the load supported thus to a mounting surface.

Alike the front cover of the body, the neck portion and the base portion shown in FIG. 7 can have the gradation effect. Since the neck portion and the base portion, both exposed to a front direction of the display device, are also portions on which the user's line of sight can be focused, design thereof can be made to be high quality for generating the gradation effect. Description of the front cover which duplicates with drawings and descriptions made before is omitted.

FIGS. 8A~8C illustrate a perspective view of a stand of a display device, and a diagram of a neck cover of a neck portion, respectively. In detail, FIG. 8A illustrates a perspective view of a stand 200 of a display device, FIG. 8B illustrates a front view of the neck cover, and FIG. 8C illustrates a section of the neck cover.

Referring to FIG. 8A, edges of the neck portion and the base portion of the stand have the gradation effects respectively. Though all of the neck portion 210 and the base portion 220 have the gradation effects, alike FIGS. 3 and 5, any one of the neck portion 210 and the base portion 220 is made to have the gradation effect.

The neck portion 210 may include a neck cover 222 formed of a light transmissive material to have a height, with a thickness at a top side or a bottom side thereof varied in a height direction, i.e., a vertical direction, for the gradation effect.

Alike the front cover 120, the neck cover 222 which forms an exterior of the neck portion 210 of the display device of the present invention may be formed of a transparent resin of a particular color for generating the gradation effect.

Figure 8:
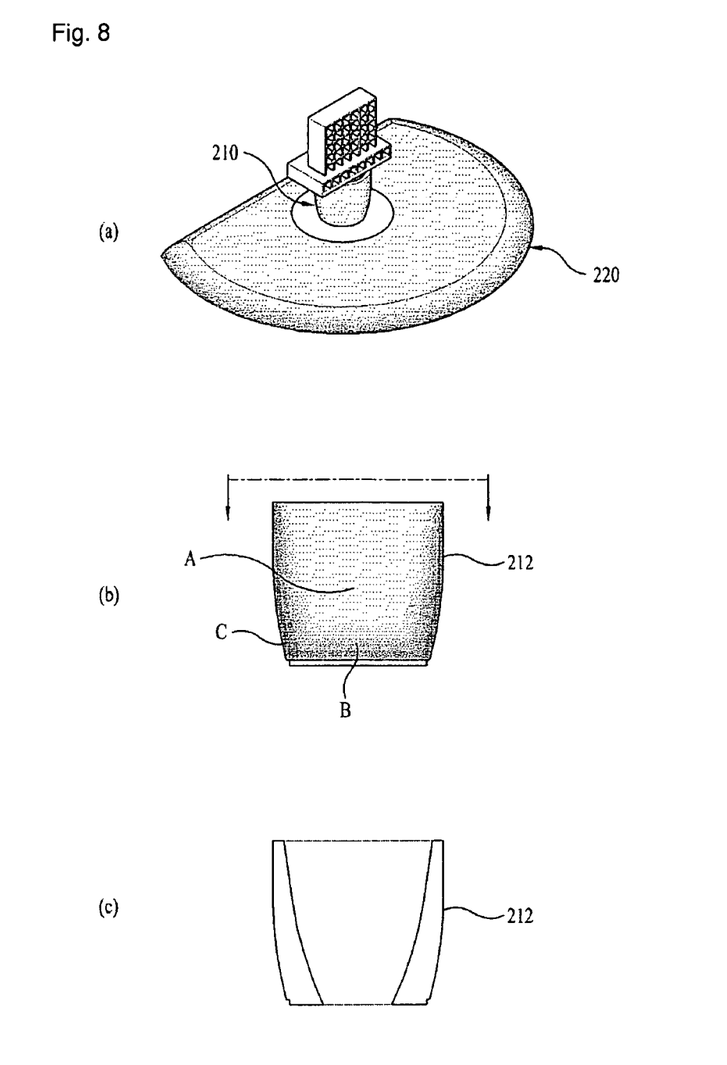
FIG. 8 illustrates a perspective view of a stand of a display device, and a diagram of a neck cover of a neck portion.

Referring to FIG. 8, the neck cover of the neck portion 210 may have the gradation effect varied with a height thereof. That is, as shown in FIG. 6B, it can be noted that the gradation effect of the top side of the neck cover 212 is more distinctive than the gradation effect of the bottom side. If the gradation effect varies with regions, a design of the display device can be made to be higher quality or to have a better sense of stereo.

In order to make the gradation effect generated at the neck cover 212 vary gradually, it is required that a thickness of the neck cover 212 varies, gradually.

As shown in a section of the neck cover in FIG. 8C, the neck cover has a thickness which becomes the thicker as the neck cover goes from a top side to a bottom side.

Since the neck cover has a thickness varied with the height, the gradation effect can vary with the height. As shown in FIG. 8C, since the neck cover has a thickness which becomes the thicker as the neck cover goes from a top side to a bottom side, if the neck cover 212 is observed from an outside, the neck cover 212 will have a sense of color which appears the darker as the neck cover goes toward the bottom side the more. Moreover, even if the same height of the neck cover 212 is observed, there can be a portion which appears darker depending on a direction of observation. Since the neck cover 212 has a pipe like shape which forms an exterior of the neck portion 210, the gradation effect owing to the thickness may be set to be similar at the same height.

However, even if the portions are at the same height, the gradation effects can be different.

The gradation effects at A, B, and C regions in FIG. 8B will be described. Since the A region has a thickness of the neck cover 212 different from the thickness of the B region as shown in FIG. 8C, basically, the gradation effect is generated. That is, the B region appears darker than the A region.

However, even if the B region has a thickness the same with the C region, the C region will appear darker.

This is because the thickness of the material becomes thicker and, at the same time, the transmission length of the line of sight in a tangential direction becomes longer.

Figure 6:
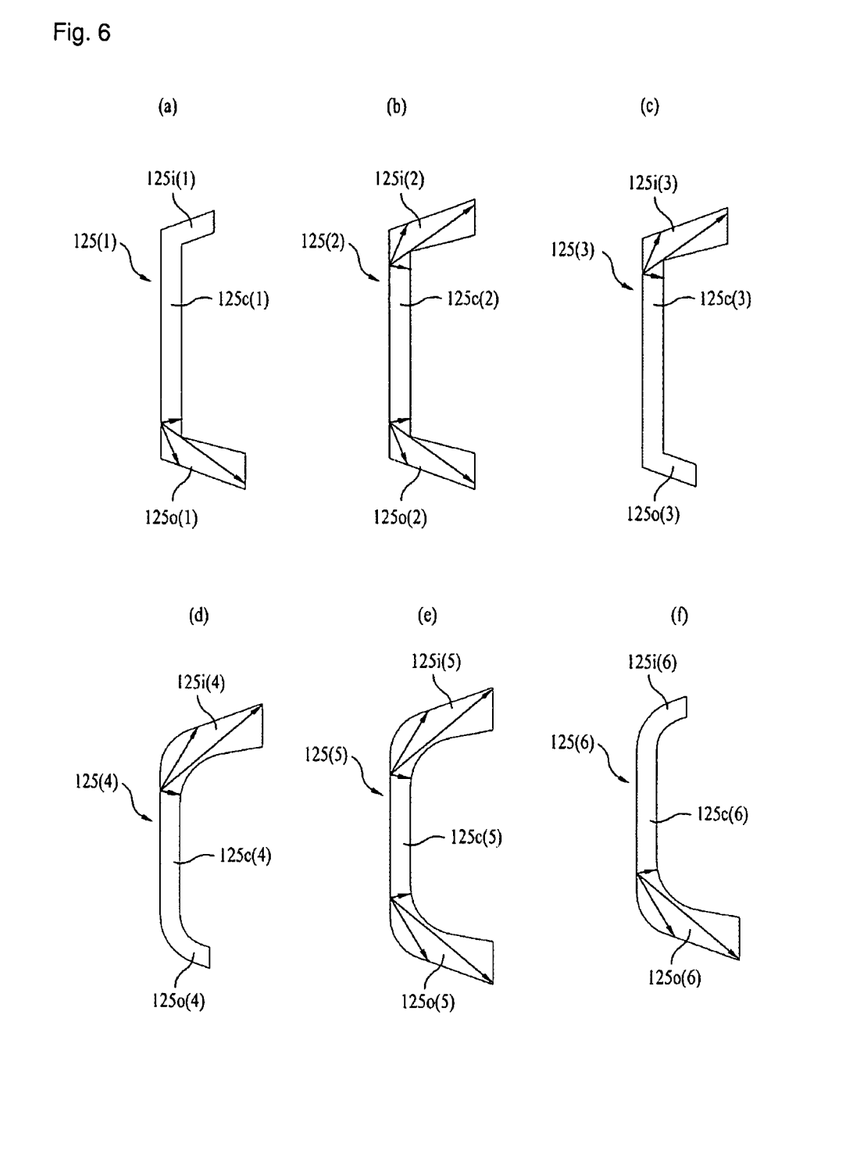
FIGS. 6A~6F illustrate sections of the front cover of the display device in FIG. 5, respectively.

Since the neck cover 212 is cylindrical, the neck cover 212 has an effect identical to the rounded front cover in FIGS. 4 and 6.

Figure 9:
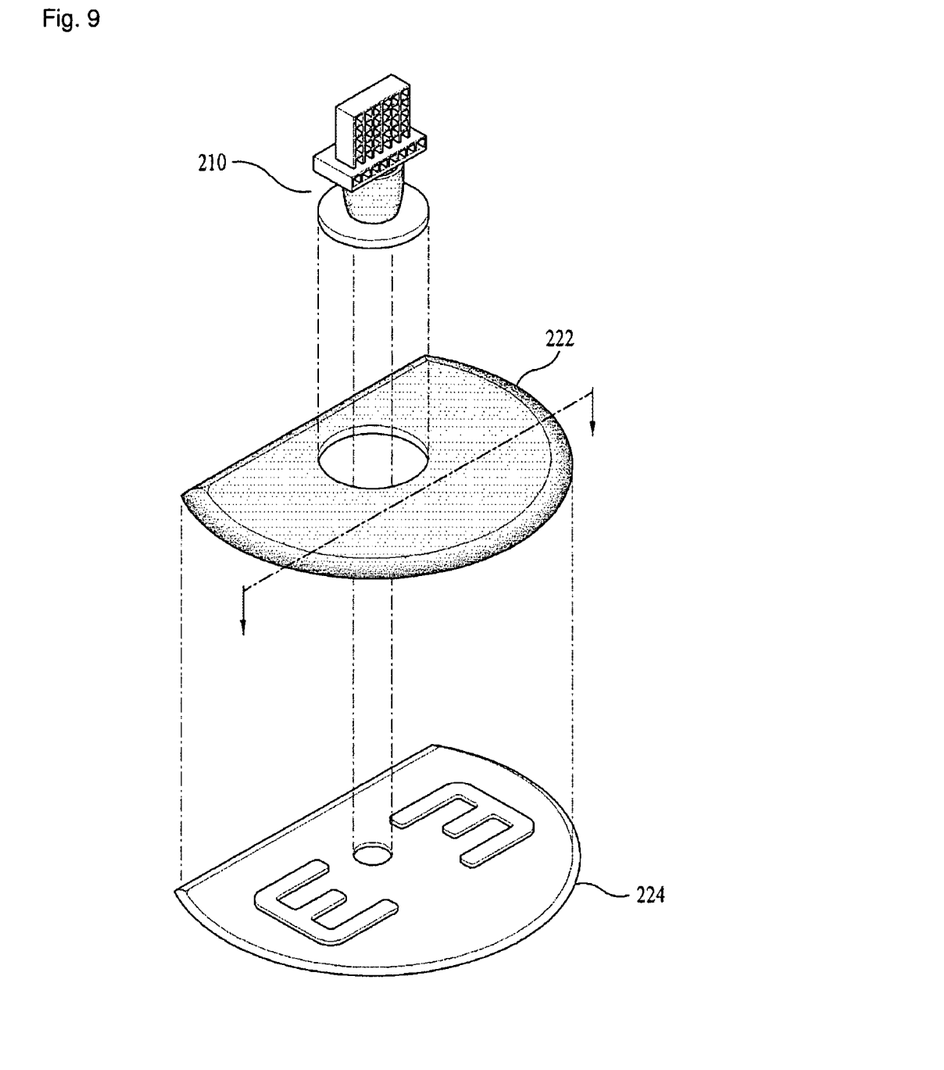
FIG. 9 illustrates an exploded perspective view of a base of a stand of a display device.

FIG. 9 illustrates an exploded perspective view of a base portion 220 of a stand 200 of a display device. The base 220 also includes a base cover 222 which forms an exterior thereof and a metal reinforcing plate 224 which serves to distribute the load of the neck portion 210 to a mounting surface, actually.

The base cover 222 has a thin and wide plate shape having a pass through hole formed at a center for pass through of the stand. A portion of the base cover 222 from which the gradation effect can be induced easily is an edge portion of the base cover 222. Accordingly, by making the edge portion of the base cover 222 thicker than other portion, the gradation effect can be obtained.

Figure 10:
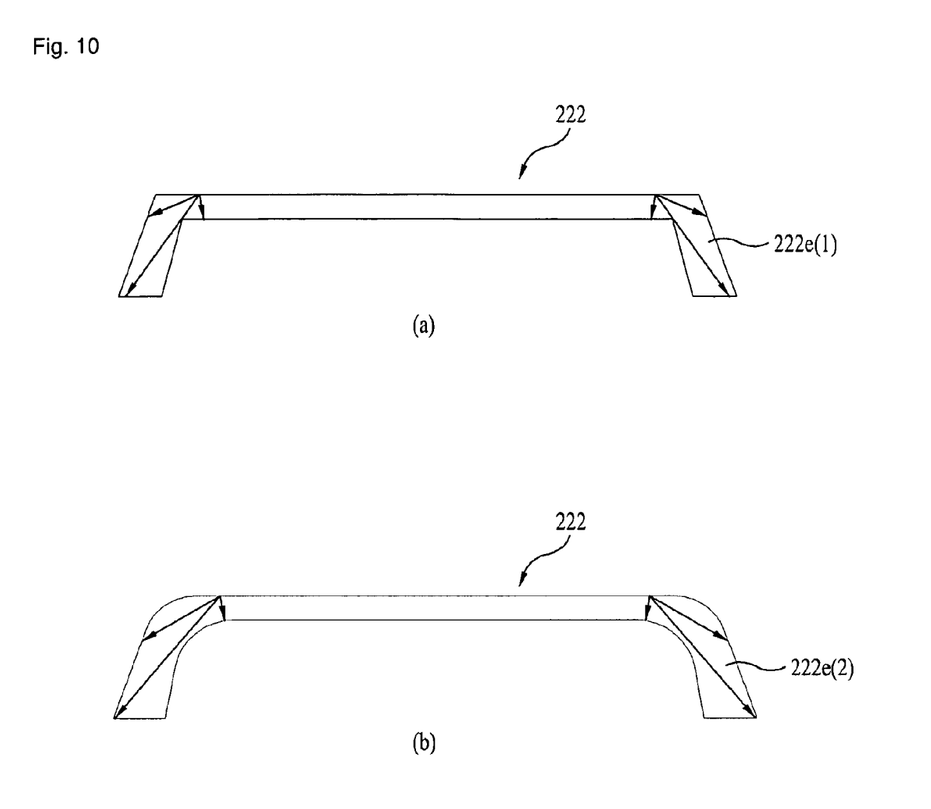
FIG. 10 illustrates a section of a base cover of a display device in accordance with a preferred embodiment of the present invention.

FIG. 10 illustrates a section of a base cover of a display device in accordance with a preferred embodiment of the present invention. In detail, FIG. 10A illustrates a case when an edge 222e of the base cover 222 has a thickness thicker than other portion, and FIG. 10B illustrates a case when the edge 222e(2) of the base cover has a thickness thicker than other portion as well as rounded.

Alike the front cover, back sides of the neck cover 212 and the base cover 222 shown in FIGS. 8 and 9 respectively can also be painted or coated with a non-transparent material for making an exterior of the display device neat by blocking the neck cover 212 and the base cover 222 from coming into vision.

Alike the front cover shown in sections of FIGS. 4 and 6, the thickness of the edge of the base cover is thicker than the other portion. Accordingly, the generation of the gradation effect focused at the edge portion which is thicker, and the amplification of the gradation effect depending on an observation angle of the observer is the same with the case of the neck cover 212.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A display device comprising:
 a display body including a front cover having a display region and a non-display region, a display module arranged in rear of the front cover, and a rear cover which surrounds a back side of the display module; and
 a stand including a neck portion mounted to the display body and a base portion connected to the neck portion for seating on a mounting surface,
 wherein the base portion includes a base cover formed of a light transmissive material to have a pass through hole therein for pass through of the neck portion, and an edge portion with a thickness thicker than other portion of the base cover.

2. The display device as claimed in claim 1, wherein the neck portion includes a neck cover formed of a light transmissive material to have a height, wherein the neck cover has a thickness of a top side and a thickness of a bottom side varied in a vertical direction.

3. The display device as claimed in claim 2, wherein an inside surface of the neck cover and a bottom surface of the base cover are painted or coated with a non-transparent material.

4. The display device as claimed in claim 2, wherein both the neck cover and the base cover are injection moldings of polycarbonate resin of a particular color.

5. The display device as claimed in claim 1, wherein the non-display region of the front cover is divided into an inner edge adjacent to the display region, an outer edge, and a middle portion which connects the inner edge to the outer edge, wherein the at least one of the inner edge and the outer edge has a thickness thicker than the middle portion.

* * * * *